(12) United States Patent
Kawamoto et al.

(10) Patent No.: US 8,305,044 B2
(45) Date of Patent: Nov. 6, 2012

(54) BATTERY PACK, INFORMATION PROCESSING APPARATUS, CHARGE CONTROL SYSTEM, CHARGE CONTROL METHOD BY BATTERY PACK, AND CHARGE CONTROL METHOD BY CHARGE CONTROL SYSTEM

(75) Inventors: Daisuke Kawamoto, Tokyo (JP); Satoshi Okachi, Tokyo (JP); Kenichiro Kamijo, Nagano (JP); Seiji Tsukada, Nagano (JP); Keisuke Koide, Tokyo (JP); Norio Fujimori, Tokyo (JP); Hidetoshi Shimada, Kanagawa (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 12/494,837

(22) Filed: Jun. 30, 2009

(65) Prior Publication Data

US 2010/0007310 A1    Jan. 14, 2010

(30) Foreign Application Priority Data

Jul. 11, 2008 (JP) ................................. 2008-181945
Sep. 9, 2008 (JP) ................................. 2008-231432

(51) Int. Cl.
*H02J 7/04* (2006.01)
(52) U.S. Cl. ....................................... 320/153; 320/152
(58) Field of Classification Search .................. 320/150, 320/152, 153
See application file for complete search history.

(56) References Cited

U.S. PATENT DOCUMENTS 7,948,212 B2 *    5/2011   Odaohhara ................... 320/150

FOREIGN PATENT DOCUMENTS

| JP | 10-70846 | 3/1998 |
|---|---|---|
| JP | 2002-374636 | 12/2002 |
| JP | 2004-222427 | 8/2004 |
| JP | 2004-304957 | 10/2004 |
| JP | 2007-18761 | 1/2007 |
| JP | 2008-5593 | 1/2008 |
| JP | 2008-99411 | 4/2008 |

OTHER PUBLICATIONS

Office Action issued Nov. 30, 2010 in Japanese Patent Application No. 2008-231432.
"A Guide to the Safe Use of Secondary Lithium Ion Batteries in Notebook-type Personal Computers", Japan Electronics and Information Industries Association and Battery Association of Japan, Apr. 20, 2007, 18 pages.
Japanese Office Action issued Nov. 15, 2011, in Patent Application No. 2008-231432.

* cited by examiner

*Primary Examiner* — Richard V Muralidar
(74) *Attorney, Agent, or Firm* — Oblon, Spivak, McClelland, Maier & Neustadt, L.L.P.

(57) ABSTRACT

A battery pack includes: an obtaining unit for obtaining computation information for calculating a charge current including temperature information of a battery; a computation unit for computing a charge current for the battery based on the computation information; and a notification unit for notifying a computer of the charge current computed by the computation unit. The notification unit uses a dedicated command to notify the computer of the charge current. The battery pack includes: a storage unit for storing therein a first threshold value and a second threshold value relating to the temperature information, and the computation unit may compute the optimal charge current depending on which of ranges divided by the first threshold value and the second threshold value the temperature information belongs to.

6 Claims, 12 Drawing Sheets

FIG.3
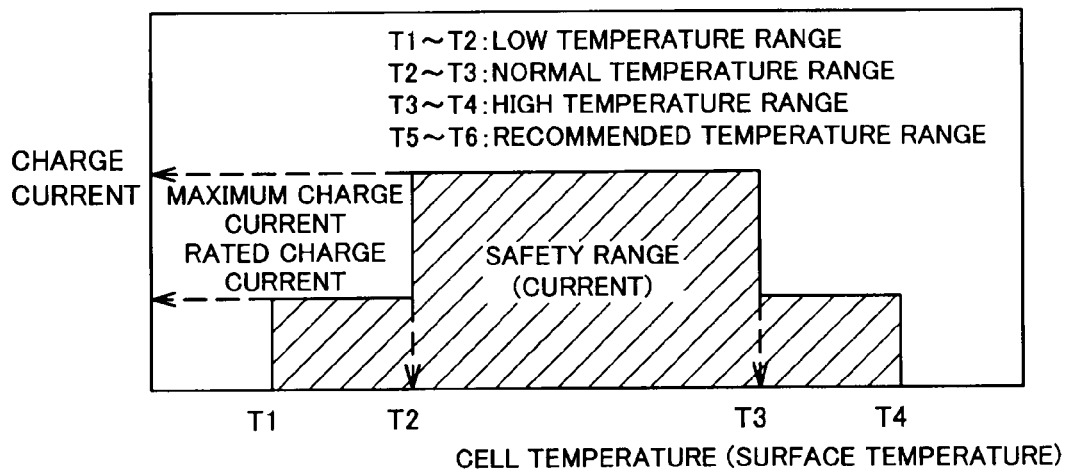
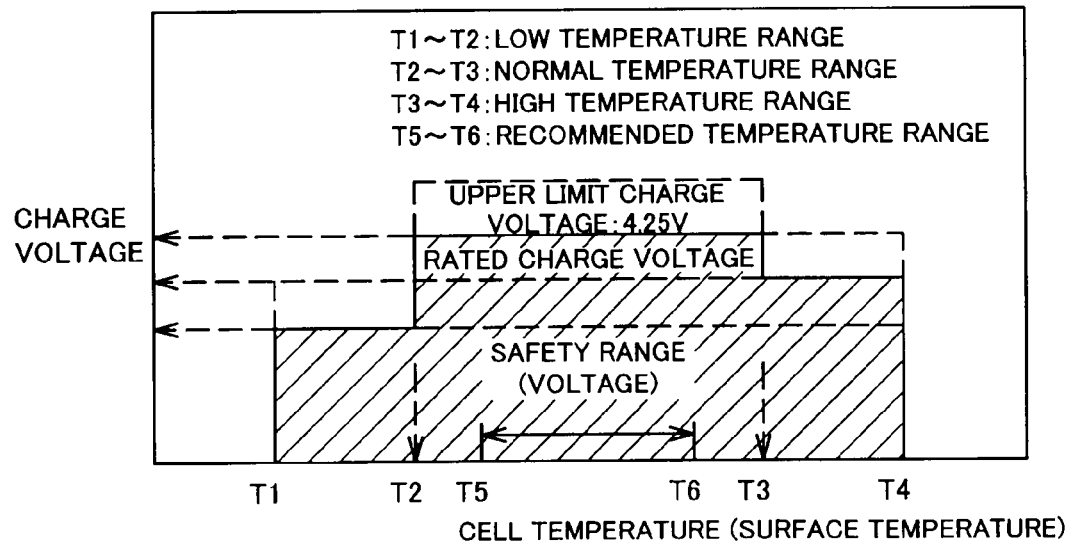

FIG.12

| | | EC / CHARGER | |
|---|---|---|---|
| | | NORMAL | ABNORMAL |
| BATTERY MICROCOMPUTER | NORMAL | NO PROBLEM | • RAPID CHARGE IS PERFORMED EVEN IN RAPID CHARGE DISABLE RANGE ⇒BATTERY MICROCOMPUTER DETECTS ABNORMAL CHARGE (MISMATCH BETWEEN REQUESTED CURRENT VALUE AND ACTUALLY-MEASURED CURRENT VALUE) ⇒STOP CHARGE ACCEPTANCE |
| | ABNORMAL | • COMMUNICATION ERROR OCCURS BETWEEN EC AND BATTERY MICROCOMPUTER ⇒EC DETECTS ABNORMAL COMMUNICATION ⇒STOP CHARGE OUTPUT (CHARGE RECOVERY BY COMMUNICATION NORMALIZATION) | • RAPID CHARGE IS PERFORMED EVEN IN RAPID CHARGE DISABLE RANGE ⇒NO SECURITY RISK IF SAFETY MARGIN RANGE IS SATISFIED (t1 TO t2°C, t3 TO t4°C) SECURITY RISK IS PRESENT IN OTHER RANGES (t1°C OR LESS, t4°C OR MORE) BUT INDEPENDENT OVERCURRENT PROTECTION FUNCTION (SECONDARY PROTECTION IC) OPERATES AT CURRENT CERTAIN CHARGE CURRENT VALUE OR MORE. SECONDARY PROTECTION FUNCTION FOR HARDWARE PROTECTION (SUCH AS FUSE) MAY BE MOUNTED AS NEEDED. |

BATTERY PACK, INFORMATION PROCESSING APPARATUS, CHARGE CONTROL SYSTEM, CHARGE CONTROL METHOD BY BATTERY PACK, AND CHARGE CONTROL METHOD BY CHARGE CONTROL SYSTEM

BACKGROUND OF THE INVENTION

1. Field of the Invention

The present invention relates to a battery pack, information processing apparatus, charge control system, charge control method by battery pack, and charge control method by charge control system. More particularly, the present invention relates to a technique for controlling the amount of current or an output stop function at a charger depending on a temperature of the battery pack.

2. Description of the Related Art

In related art, battery charging has been generally performed by a current having a certain current value irrespective of an environmental temperature. In this case, the charge reaction is a chemical reaction and is largely influenced by a temperature. When charging is performed by a current having a certain current value, a likelihood of side-effect or a state of charge product is largely different depending on the temperature. Thus, many manuals or recommended standards for safe usage of a battery pack and the like for a personal computer have been issued from various institutions and battery charge control requires to be reconsidered (see Non-Patent Document 1, for example).

A charge current value is desirably reduced in low and high temperature ranges having a security risk while more charge current and reduced charge time are required in terms of usability. The conflicting charge specifications require to be met.

[Non-Patent Document 1] "Manual for safe usage of lithium ion secondary battery in notebook type PC", [online], 20 Apr. 2007, Japan Electronics and Information Technology Industries Association, Battery Association of Japan, [16 Jun. 2008 searched], Internet <http://it.jeita.or.jp/perinfo/committee/pc/battery/070420.pdf>

SUMMARY OF THE INVENTION

However, there was an issue that there was no function of controlling the amount of current or an output stop function at a charger depending on a temperature of a battery pack.

The present invention has been made in views of the above issue and it is desirable to provide a novel and improved technique capable of controlling the amount of current or an output stop function at a charger depending on a temperature of a battery pack.

According to an embodiment of the present invention, there is provided a battery pack including an obtaining unit for obtaining computation information for calculating a charge current including temperature information of a battery; a computation unit for computing a charge current for the battery based on the computation information; and a notification unit for notifying a computer of the charge current computed by the computation unit.

With the structure, it is possible to monitor a temperature inside a battery pack and to control the amount of charge current in real time depending thereon.

According to the embodiments of the present invention described above, it is possible to monitor a temperature inside a battery pack and to control the amount of charge current in real time depending thereon. Further, there is an effect that a certain charge current is secured in a normal temperature range so that a charge time is not increased and usability is not lost. Furthermore, a dedicated command is provided so that a communication traffic can be alleviated, and a computing function is provided at a battery so that the number of steps for design and development can be reduced at a computer main body. Thus, efficient charging can be performed while securing the safety.

BRIEF DESCRIPTION OF THE DRAWINGS

FIG. 3 is a diagram for explaining three ranges (normal temperature range, low temperature range, high temperature range);

FIG. 12 is a diagram showing one example of a protection function when a device is abnormal.

DETAILED DESCRIPTION OF THE PREFERRED EMBODIMENTS

Figure 1:
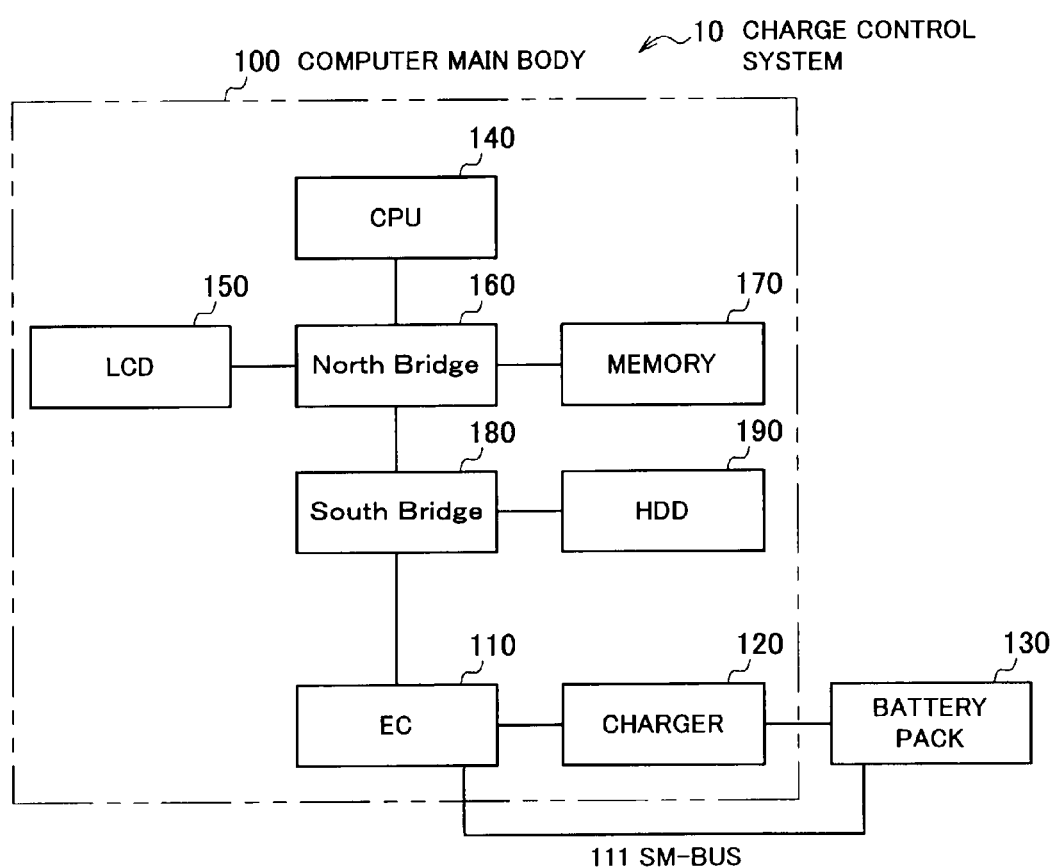
FIG. 1 is a diagram showing a system structure according to the present embodiment.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

First Embodiment

System Structure of the First Embodiment

First, a system structure of the present embodiment will be described below.

FIG. 1 is a diagram showing a system structure according to the present embodiment. As shown in FIG. 1, a charge control system 10 is, for example, a computer such as notebook type personal computer, and includes a computer main body 100 and a battery pack 130. The notebook type personal computer is employed as one example of the charge control system 10, but the charge control system 10 is not particularly limited thereto if it is a battery-driven device.

The computer main body 100 includes an EC (Embedded Controller) (charge control unit) 110, a charger 120, a battery pack 130, a CPU (Central Processing Unit) 140, a LCD (Liquid Crystal Display) 150, a North Bridge 160, a memory 170, a South Bridge 180, a HDD (Hard Disk Drive) 190 and the like. The EC 110 and the battery pack 130 are connected via a SM-BUS (System Management-Bus) 111.

The EC 110 is a LSI (Large Scale Integration) normally incorporated in a notebook type personal computer or the like and is responsible for control of keyboard, power management control of various power supplies, and the like. In the present embodiment, the LSI employs the EC 110 but is not limited to the EC 110. Other structure may be employed if it is communicable with the battery pack 130 via the SM-BUS 111 and has a function of controlling the charger 120. The EC 110 can obtain a status of a battery of the battery pack 130 such as battery's remaining capacity or manufacture information via the SM-BUS 111.

The SM-BUS 111 is a 2-line bus for communication between components (particularly semiconductor ICs) in a computer. The SM-BUS 111 can be employed here but the bus is not limited to the SM-BUS 111. Other structure may be employed if it can be used for a communication between the EC 110 and the battery pack 130.

The charger 120 has a multi-stage switch function of the amount of current (charge current value) supplied to the battery. In other words, the charger 120 has a function of supplying a designated current to the battery pack 130 based on a current value designation signal from the EC 110.

The battery pack 130 has a battery, and has a battery in Smart Battery System (referred to as SBS below) standard or having equivalent functions. In the present embodiment, a dedicated command for switching a charge current is supported other than commands normally provided in the SBS. The dedicated command will be described below in detail. A temperature/current/voltage function for battery cell is present inside the battery pack 130 and is managed by a dedicated LSI. The details of the structure of the battery pack 130 will be described below with reference to FIG. 2. The cell means a basic structural unit of a system which includes electrodes, separators, electrolytic solution, containers, terminals and the like and charges to convert chemical energy into electric energy and supplies an electric energy source (see Non-Patent Document 1 described above). A computer battery pack is typically an assembled battery in which a plurality of single electric cells and control circuits are combined, and the single electric cell is denoted as cell in the present embodiment. Further, a collection of cells and a single cell are collectively denoted as the battery 138.

In the present embodiment, there is mounted a dedicated custom command for requesting a current necessary for the battery from the battery pack 130 to the EC 110. In a typical PC, since the EC 110 is a master of the device and the battery is a slave thereof, the EC 110 periodically issues the dedicated custom command and the battery provides necessary current value information in response to the command. The battery comprehensively calculates an optimal charge current value from various items of environmental information such as a temperature inside the battery pack 130, a remaining capacity value of the battery and voltage information of the battery cell, and presents the same to the EC 110. The battery may be a master as an application.

<Hardware Structure of the Battery Pack 130>

Figure 2:
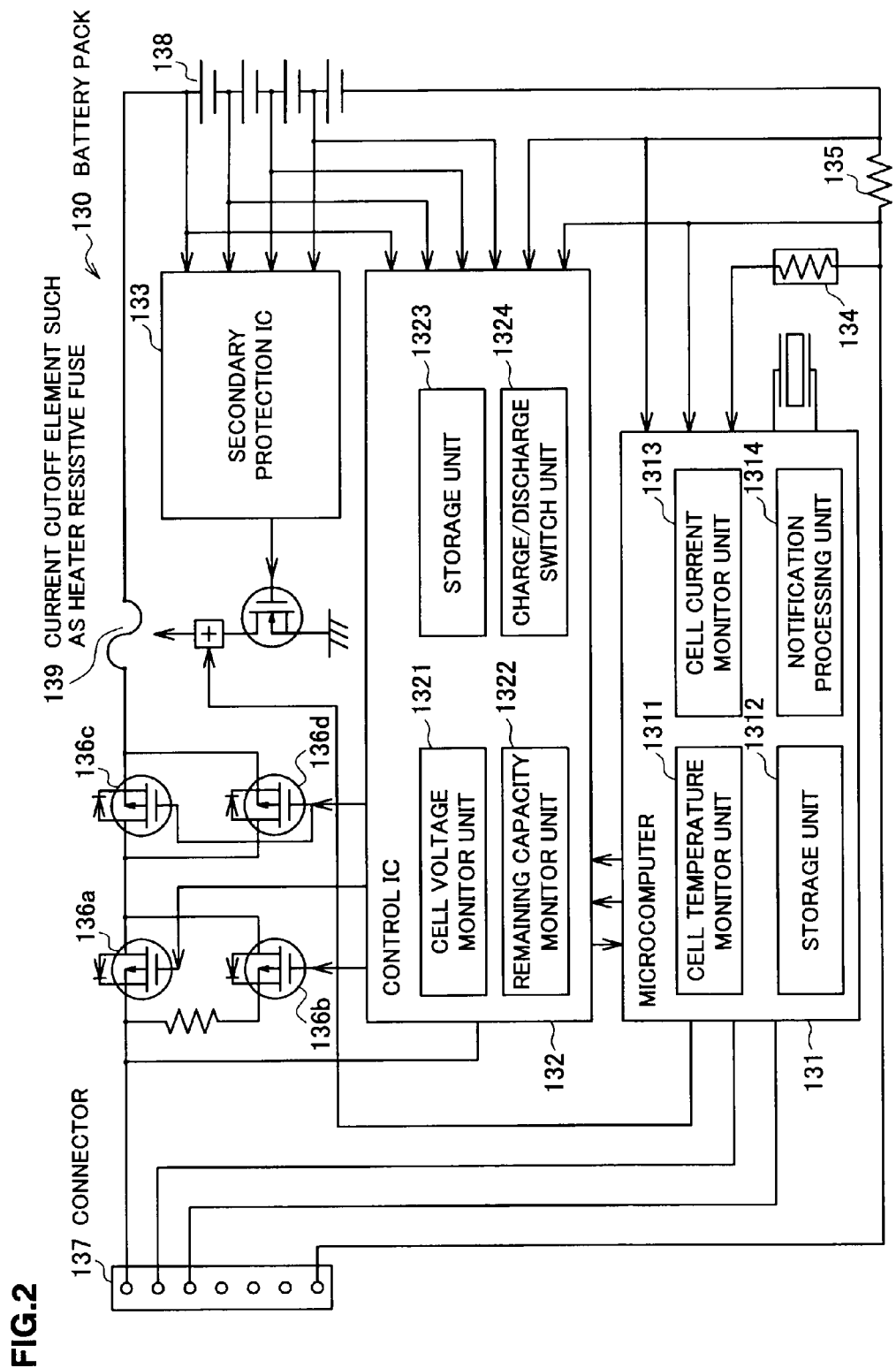
FIG. 2 is a diagram showing a hardware structure of a battery pack according to the present embodiment.

FIG. 2 is a diagram showing a hardware structure of the battery pack according to the present embodiment. The hardware structure of the battery pack according to the present embodiment will be described with reference to FIG. 2 (see FIG. 1 as needed).

The battery pack 130 includes an obtaining unit for obtaining computation information for calculating a charge current including temperature information of the battery 138, a computation unit for computing a charge current for the battery based on the computation information, and a notification unit for notifying a computer of the charge current computed by the computation unit. The charge current may be notified to the computer by using a dedicated command.

The battery pack 130 further includes a storage unit for storing therein a first threshold value and a second threshold value relating to the temperature information, and the computation unit may compute an optimal charge current depending on which of the ranges divided by the first threshold value and the second threshold value the temperature information belongs to.

The storage unit stores therein a charge condition depending on a range divided by the first threshold value and the second threshold value, and the computation unit may compute an optimal charge current based on a range to which the temperature information belongs and a charge condition depending thereon.

The battery pack 130 may further include a detection unit for detecting whether the temperature information is below the first threshold value or above the second threshold value. In either case, when it is detected that the temperature information is below the first threshold value or above the second threshold value, the notification unit may notify the computer of a request of stopping charging to the battery 138.

The battery pack 130 may further include a detection unit for detecting whether the temperature information is below the first threshold value or above the second threshold value. In either case, the storage unit stores therein a charge condition including at least one of the charge voltage and the charge current for the battery 138 which are set depending on the range divided by the first threshold value and the second threshold value. Then, the computation information includes at least one of the charge voltage and the charge current for a present battery. When it is detected that the temperature information is below the first threshold value or above the second threshold value, the detection unit detects, based on the charge condition and the computation information, whether the battery status is abnormal. When the detection unit detects that the battery status is abnormal, the notification unit notifies the computer of a request of stopping the battery charging.

The storage unit may store therein a third threshold value lower than the first threshold value and a fourth threshold value higher than the second threshold value. In either case, when the temperature information is below the third threshold value or above the fourth threshold value, the detection unit detects that the battery status is abnormal. When the detection unit detects that the battery status is abnormal, the notification unit notifies the computer of a request of stopping the battery charging.

There can be provided an information processing apparatus including the battery pack 130 and the computer having a charge control unit for charging the battery 138 based on the charge current notified from the notification unit.

There can be provided a charge control system including the battery pack 130 and the computer having a charge control unit for charging the battery pack 138 based on the charge current notified from the notification unit.

As shown in FIG. 2, in the present embodiment, the battery pack 130 includes a microcomputer 131, a control IC 132, a secondary protection IC 133, a thermistor 134, a resistor 135, a charge FET (Field Effect Transistor) 136*a*, a backup charge FET 136*b*, a discharge FET 136*c*, a discharge FET 136*d*, a connector 137 and a battery 138. The battery pack 130 includes a monitor unit for obtaining a value indicating the status of the battery 138 and detecting that the status of the battery 138 is abnormal based on the obtained value indicating the battery status. The monitor unit is not particularly limited to but, in the present embodiment, includes at least one of a cell temperature monitor unit 1311, a cell voltage monitor unit 1321 and a remaining capacity monitor unit 1322 described later. The monitor unit performs a processing of detecting whether the battery status is abnormal, and may perform the same for each predetermined time such as once per 250 ms. As one application, battery usage history information such as battery usage accumulation time or the number of times of charge/discharge cycles may be also added to calculation parameters.

The microcomputer 131 may include the cell temperature monitor unit 1311 for monitoring a cell temperature of the battery 138 as one example of the monitor unit. In this case, the microcomputer 131 includes a storage unit 1312 for storing therein an upper limit value of a normal range and a lower limit value of the normal range. The microcomputer 131 obtains the cell temperature of the battery 138 as the value indicating the battery status, and when the obtained value is above the upper limit value of the normal range stored in the storage unit 1312 or below the lower limit value of the normal range, detects that the battery status is abnormal. The cell temperature monitor unit 1311 A/D converts a divided voltage between the resistor of the thermistor 134 and an external resistor, for example, to measure the cell temperature of the battery 138.

The microcomputer 131 may include the cell current monitor unit 1313 for monitoring a current value flowing through the cell of the battery 138. The cell current monitor unit 1313 A/D converts a voltage of the resistor 135, for example, to measure the current value flowing through the cell of the battery 138.

Further, the microcomputer 131 may include a notification processing unit 1314 for, when various monitor units detect that the battery status is abnormal, notifying the computer main body 100 of a request of stopping battery charging by the charger 120. The notification processing unit 1314 may perform the processing for each predetermined time such as once per 16 to 30 seconds.

The storage unit 1312 may store therein at least one threshold value. In this case, when it is determined that the battery status is not abnormal, the cell temperature monitor unit 1311 determines which range in two or more ranges classified by the threshold values the value indicating the battery status belongs to. In either case, the notification processing unit 1314 notifies the computer main body 100 of the range determined by the cell temperature monitor unit 1311. Two or more ranges include at least a range in which a normal value is designated as a current value when the charger 120 charges the battery and a range in which a value larger than the normal value or a value smaller than the normal value is designated.

The storage unit 1312 may store therein two values such as a low temperature side value and a high temperature side value as threshold values, for example. The two threshold values classify a value indicating the battery status into three ranges. Thus, when it is determined that the battery status is not abnormal, the cell temperature monitor unit 133 determines which range in the three ranges (normal temperature range, low temperature range, high temperature range) classified by the threshold values the value indicating the battery status belongs to. In either case, the notification processing unit 1314 notifies the computer main body 100 of the range determined by the cell temperature monitor unit 1311.

When the notification of the range determined by the cell temperature monitor unit 1311 is accepted, if the range is the low temperature range or the high temperature range, the computer main body 100 preferably sets the charge current (charge voltage) supplied to the battery pack 130 by the charger 120 to be low. For example, in the normal temperature range (for example, 10 to 45° C.), the charge current supplied to the battery pack 130 by the charger 120 is set at 1500 mA (0.71 It), for example. On the other hand, for example, in either case of the low temperature range (for example, 0 to 10° C.) or the high temperature range (for example, 45 to 60° C.), the charge current supplied to the battery pack 130 by the charger 120 is set at 750 mA (0.35 It), for example.

For example, when the cell of the battery 138 is configured with a lithium ion cell or the like, if the cell temperature is high, there is an issue that positive/negative electrode structure would break due to heat generation caused by internal short-circuit or external heating. Then, there is an issue that generated oxygen reacts with electrolyte to cause smoking or firing.

For example, when the cell of the battery 138 is configured with a lithium ion cell or the like, if the cell temperature is low, a material moving speed is reduced and the insertion of lithium ion into negative-electrode carbons is slowed. This is due to a high possibility that lithium is precipitated on the negative-electrode carbons, leading to heat generation or firing due to internal short-circuit. The three ranges (low temperature range, normal temperature range, high temperature range) will be described below with reference to FIG. 3.

The control IC 132 may include a cell voltage monitor unit 1321 for monitoring a cell voltage of the battery 138 as one example of the monitor unit. In this case, the control IC 132 includes the storage unit 1323 for storing therein an upper limit value of the normal range and a lower limit value of the normal range. Further, in this case, the control IC 132 obtains the cell voltage of the battery 138 as a value indicating the battery status, and when the obtained value is above the upper limit value of the normal range stored in the storage unit 1323 or below the lower limit value of the normal range, detects that the battery status is abnormal.

The control IC 132 may include a remaining capacity monitor unit 1322 for monitoring a remaining capacity of the battery 138 as one example of the monitor unit. In this case, the control IC 132 includes the storage unit 1323 for storing therein an upper limit value of the normal range and a lower limit value of the normal range. In this case, the control IC 132 obtains the remaining capacity of the battery 138 as a value indicating the battery status, and when the obtained value is above the upper limit value of the normal range stored in the storage unit 1323 or below the lower limit value of the normal range, detects that the battery status is abnormal. In consideration of the issue that a large current may not be flowed below the remaining capacity of 3V after the discharging of the battery 138 proceeds, the lower limit value of the normal range of the remaining capacity of the battery 138 may be assumed at 3V, for example.

The storage unit 132 may further store therein at least one threshold value. In this case, when it is determined that the battery status is not abnormal, the cell voltage monitor unit 1321 or the remaining capacity monitor unit 1322 determines which of two or more ranges classified by the threshold values the value indicating the battery status belongs to. In this case, the notification processing unit 1314 notifies the computer main body 100 of the range determined by the cell temperature monitor unit 1311. The two or more ranges include at least a range in which a normal value is designated as a current value when the charger 120 charges the battery, and a range in which a value larger than the normal range or a value smaller than the normal value is designated.

Further, the control IC 132 includes a charge/discharge switch unit 1324 for, when various monitor units detect that the battery status is abnormal, stopping acceptance of the battery charging from the charger 120. In order to stop acceptance of the battery charging from the charger 120, the charge FET 136a may be turned OFF, for example.

The secondary protection IC 133 is a secondary protection element in preparation to a case in which the microcomputer 131, the control IC 132 and the like are out of control, and has a function of monitoring a voltage of the battery 138, and the like, for example.

The thermistor 134 is arranged on the cell surface of the battery 138, for example, and has a function as a sensor for measuring the cell temperature of the battery 138.

The resistor 135 is arranged between the GNDs of the cell GND and the SM-BUS 111, for example.

The charge FET 136a, the backup charge FET 136b, the discharge FET 136c and the discharge FET 136d are transistors for controlling charge/discharge of the battery pack 130. The charge FET 136a and the backup charge FET 136b flow a current in the charge direction when being turned ON, and stop the current in the charge direction when being turned OFF. The discharge FET 136c and the discharge FET 136d flow a current in the discharge direction when being turned ON, and stop the current in the discharge direction when being turned OFF.

The connector 137 connects the EC 110 or the charger 120 and the battery pack 130. A charge current is supplied from the charger 120 via the connector 137 at the time of charging. Further, in the battery pack 130, the SM-BUS 111 connects the microcomputer 131 and the EC 110 via the connector 137.

The battery 138 has one or more cells. Further, the battery 138 is supplied with a charge current from the charger 120 to be charged.

The current cutoff element 139 such as heater resistive fuse is directed for stopping a current flow when the voltage exceeds a predetermined value, and the predetermined value is set at 4.3 V, for example.

Basic Operation of the System According to the Present Embodiment

A basic flow relating to current value switching will be described below.

(1) The EC 110 periodically issues a dedicated custom command.

(2) The battery pack 130 provides optimal current value information necessary for the battery 138 to the EC 110 in response to the command.

(3) The EC 110 controls the charger 120 to supply an optimal charge current to the battery pack 130 based on the current value information indicated in the response data.

<Disadvantages When the EC 110 Determines an Optimal Current>

When EC 110 is configured as a mechanism for computing and determining an optimal current, the EC 110 needs to obtain various items of data such as temperature information, remaining capacity information and cell voltage information from the battery pack 130 and to perform computation for comprehensive determination. Since the current switching needs to be performed in real time, the traffic of the SM-BUS 111 increases and the processing load at the EC 110 increases. Further, part of necessary data may miss due to communication error or packet loss, and thus there is a possibility that computation may not be correctly performed.

<Advantage (I) When the Battery Pack 130 Determines an Optimal Current>

On the contrary, as shown in the present embodiment, when there is employed the mechanism in which the battery pack 130 computes and determines an optimal current, only necessary current needs to be presented to the EC 110, thereby contributing to load alleviation at the EC 110. (Since the LSI inside the battery pack 130 manages the temperature information, the remaining capacity information, the cell voltage information and the like, comprehensively-higher performance can be kept when the computation is performed at the battery pack 130.)

<Advantage (II) When the Battery Pack 130 Determines an Optimal Current>

While the PC main body is developed for each machine type, the battery pack is generally developed irrespective of machine type. Thus, when the operational specification of the EC 110 is complicated, a subtle difference may occur on the operation for each machine type or a remarkably large number of steps for debug/verification must be secured for each machine type. Thus, as shown in the present embodiment, complicated parts are collected inside the battery pack 130 and the operation of the EC 110 is simplified, thereby reducing the number of steps for design and development.

<Three Ranges (Normal Temperature Range, Low Temperature Range, High Temperature Range)>

FIG. 3 is a diagram for explaining the three ranges (normal temperature range, low temperature range, high temperature range). The three ranges (normal temperature range, low temperature range, high temperature range) will be described with reference to FIG. 3. FIG. 3 and the present description are extracted from the above Non-Patent Document. Thus, one example of the three ranges (normal temperature range, low temperature range, high temperature range) is merely described.

1. On Temperature and Current

The charge reaction is a chemical reaction and is largely influenced by a temperature. Even if the same upper limit charge voltage and charge current are employed, the likelihood of the sub-reaction or the state of the charge product is remarkably different depending on the temperature. Thus, it is preferable to reduce one or both of the values of the upper limit charge voltage and the maximum charge current in the low temperature range and the high temperature range which are assumed to be under a severe condition in terms of security.

2. Normal Temperature Range T2 to T3

The temperature ranges are divided into the normal temperature range, the high temperature range and the low temperature range to define the upper limit value and the maximum value of the charge voltage and the charge current in terms of safety, and the normal temperature range T2 to T3 is defined as a cell surface temperature range to which the highest value can be applied. In the normal temperature range, the upper limit charge voltage and the maximum charge current defined in terms of safety can be received in the cell under the highest condition. When the cell surface temperature exceeds T3 during charging, the charge condition for the high temperature range must be applied. When the cell surface temperature lowers T2 during charging, the charge condition for the low temperature range must be applied.

3. High Temperature Range T3 to T4

The high temperature range T3 to T4 is a higher temperature range than the normal temperature range, and is defined as an on-charge cell surface temperature range which is permissible by changing one or both of the maximum charge current and the upper limit charge voltage in the normal temperature range in terms of safety. When the charging is performed at the same upper limit charge voltage or maximum charge current in the high temperature range as in the normal temperature range, a reduction in security is caused by stability of the positive-electrode crystal structure. Thus, the condition is switched to a charge condition defined for the high temperature range. When the cell surface temperature exceeds T3 before charging, the charge condition defined for the high temperature range is applied. When the cell surface temperature exceeds T4 during charging, charging must not be performed at any current.

4. Low Temperature Range T1 to T2

The low temperature range is a lower temperature range than the normal temperature range, and is defined as an on-charge cell surface temperature range which is permissible by changing one or both of the maximum charge current and the upper limit charge voltage in the normal temperature range in terms of safety. Since the material moving speed decreases and the insertion of lithium ion into the negative-electrode carbon delays in the low temperature range, there is a high possibility that the lithium precipitates on the negative-electrode carbon. This state easily causes thermorunaway relative to heat generation. Further, the charge acceptance largely depends on the temperature in the low temperature range so that the assembled battery is easily made unbalanced. Thus, the condition is switched to the charge condition defined for the low temperature range. When the cell surface temperature lowers T1 before or during charging, the charging must not be performed at any current.

<Charge Current Value Determination Algorithm>

Figure 4:
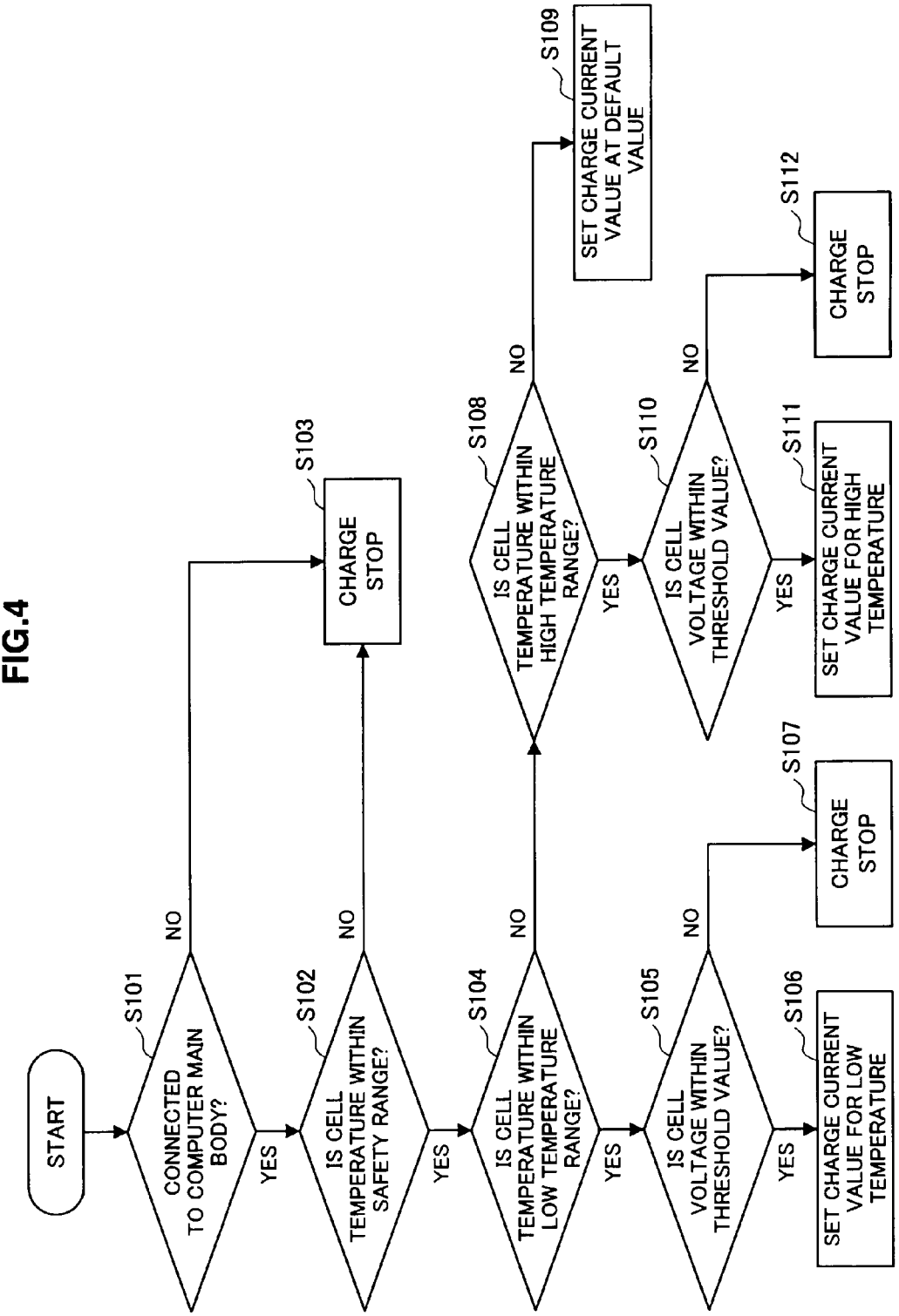
FIG. 4 is a flowchart showing a flow of a processing of determining a charge current value.

A charge current value determination algorithm will be described below. FIG. 4 is a flowchart showing a flow of a processing of determining a charge current value. The processing of determining a charge current value will be described with reference to FIG. 4 (see other figures as needed).

The battery pack 130 determines whether it is connected to the computer main body 100 (step S101). When it is determined that the battery pack 130 is not connected to the computer main body 100 ("NO" in step S101), the charging is stopped (step S103). In the processing of stopping the charging, specifically, the notification processing unit 1314 notifies the computer main body 100 of a request of stopping the battery charging by the charger 120. Thereafter, when accepting the request, the EC 110 stops the battery charging by the charger 120. A processing of stopping subsequent charging is similarly performed.

When the battery pack 130 determines that it is connected to the computer main body 100 ("YES" in step S101), the cell temperature monitor unit 1311 determines whether the cell temperature of the battery 138 is within the safety range (step S102). The determination is made by determining whether the cell temperature belongs to the normal range. When it is determined that the cell temperature is not within the safety range, ("NO" in step S102), the charging is stopped (step S103).

When it is determined that the cell temperature of the battery 138 is within the safety range ("NO" in step S101), the cell temperature monitor unit 1311 determines whether the cell temperature of the battery 138 is within the low temperature range (step S104). When it is determined that the cell temperature is within the low temperature range ("YES" in step S104), the cell voltage monitor unit 1321 determines whether the cell voltage of the battery 138 exceeds the threshold value (step S105).

When it is determined that the cell voltage of the battery 138 does not exceed the threshold value ("YES" in step S105), the charge current value for low temperature is set (step S106). In the processing of setting a charge current value for low temperature, specifically, the notification processing unit 1314 notifies the computer main body 100 of a request of converting the battery charge current by the charger 120 into the current having the charge current value for low temperature. Thereafter, when accepting the request, the EC 110 converts the battery charging by the charger 120 into the current having the charge current value for low temperature.

When it is determined that the cell voltage of the battery 138 exceeds the threshold value ("NO" in step S105), the charging is stopped (step S107).

When it is determined that the cell temperature of the battery 138 is not within the low temperature range ("NO" in step S104), the cell temperature monitor unit 1311 determines whether the cell temperature of the battery 138 is within the high temperature range (step S108). When it is determined that the cell temperature is not within the high temperature range ("NO" in step S108), the charge current value is set at a default value (step S109). In the processing of setting the charge current value at a default value, specifically, the notification processing unit 1314 notifies the computer main body 100 of a request of converting the battery charge current by the charger 120 into a current having a default value. Thereafter, when accepting the request, the EC 110 converts the battery charge current by the charger 120 into a current having the default charge current value.

When the cell temperature monitor unit 1311 determines that the cell temperature of the battery 138 is within the high temperature range ("YES" in step S108), the cell voltage monitor unit 1321 determines whether the cell voltage of the battery 138 exceeds the threshold value (step S110).

When it is determined that the cell voltage of the battery 138 does not exceed the threshold value ("YES" in step S110), the charge current value for high temperature is set (step S111). In the processing of setting a charge current value for high temperature, specifically, the notification processing unit 1314 notifies the computer main body 100 of a request of converting a battery charge current by the charger 120 into a current having a charge current value for high temperature. Thereafter, when accepting the request, the EC 110 converts the battery charge current by the charger 120 into a current having a charge current value for high temperature.

When it is determined that the cell voltage of the battery 138 exceeds the threshold value ("NO" in step S110), the charging is stopped (step S112).

<Change in Charge Current at Battery Insertion>

Figure 5:
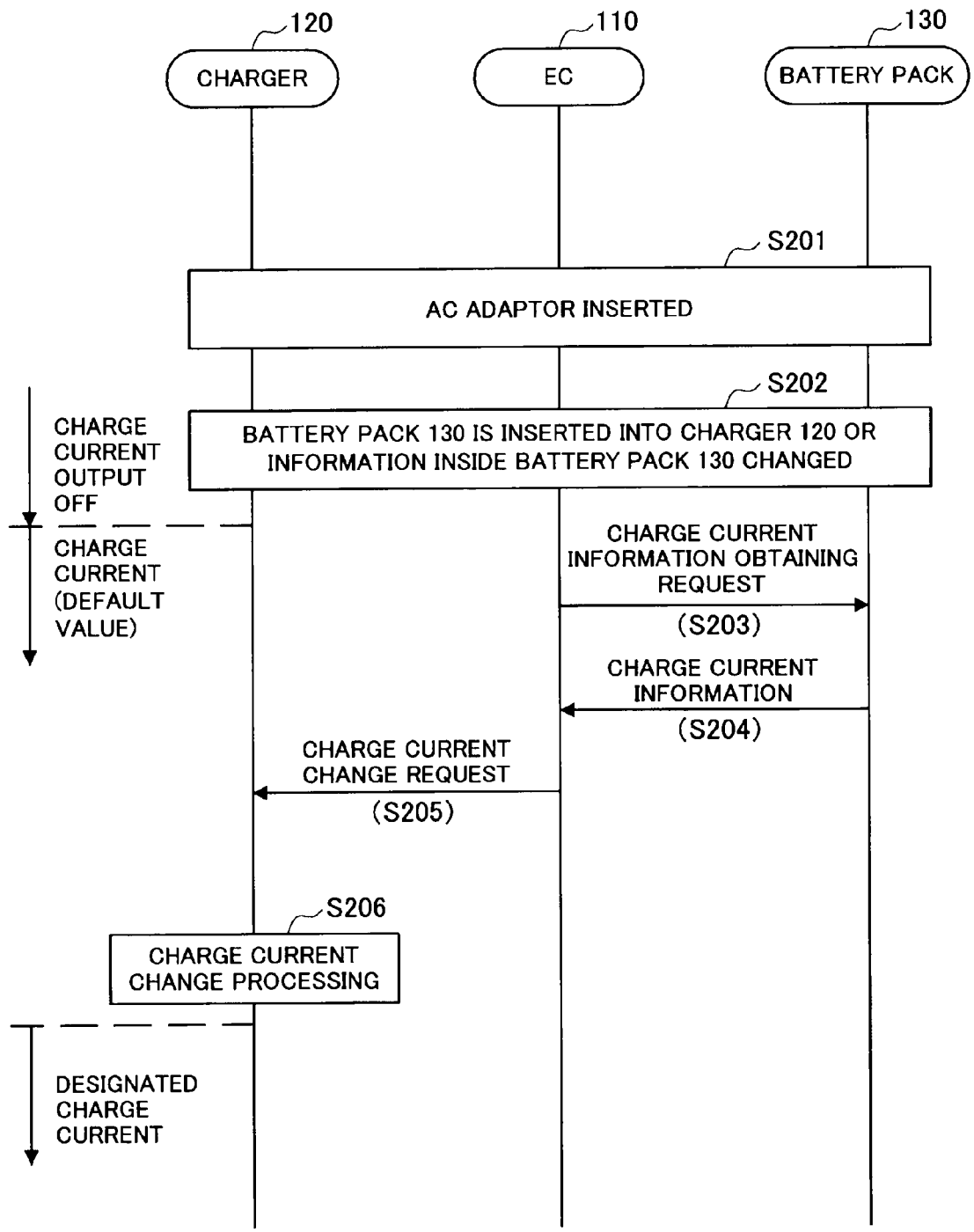
FIG. 5 is a flowchart showing a flow of a processing of changing a charge current when inserting a battery.

A change in a charge current at battery insertion will be described below. FIG. 5 is a flowchart showing a flow of a processing of changing a charge current at battery insertion. The processing of changing a charge current at battery insertion will be described with reference to FIG. 5 (see other figures as needed).

As shown in FIG. 5, an AC adaptor is inserted (step S201) and the battery pack 130 is inserted into the charger 120 or the information inside the battery pack 130 changes (step S202). The EC 110 transmits a charge current information obtaining request to the battery pack 130 (step S203). The battery pack 130 transmits the charge current information to the EC 110 (step S204) and the EC 110 transmits a charge current change request to the charger 120 (step S205). The charger 120 performs the charge current change processing (step S206).

<Change in Charge Current When Changing Charge Current Information>

Figure 6:
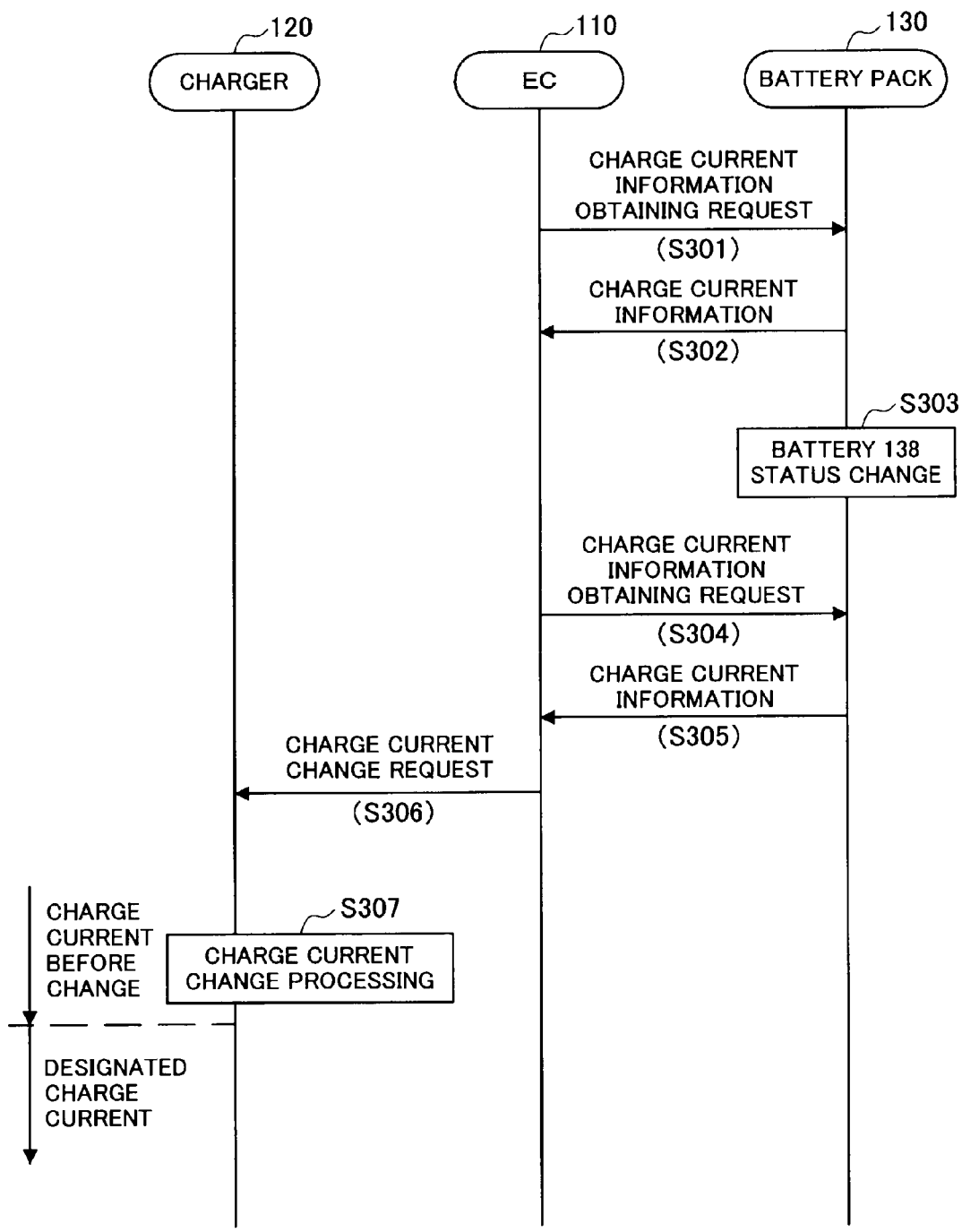
FIG. 6 is a flowchart showing a flow of a processing of changing a charge current when changing charge current information.

A change in a charge current when changing the charge current information will be described below. FIG. 6 is a flowchart showing a flow of a processing of changing a charge current when changing the charge current information. The charge current change processing when changing the charge current information will be described with reference to FIG. 6 (see other figures as needed).

As shown in FIG. 6, the EC 110 transmits a charge current information obtaining request to the battery pack 130 (step S301). The battery pack 130 transmits the charge current information to the EC 110 (step S302). The state of the battery 138 occurs (step S303). The EC 110 transmits the charge current information obtaining request to the battery pack 130 (step S304). The battery pack 130 transmits the charge current information to the EC 110 (step S305). The EC 110 transmits a charge current change request to the charger 120 (step S306). The charger 120 performs the charge current change processing (step S307).

<Failed Communication>

Figure 7:
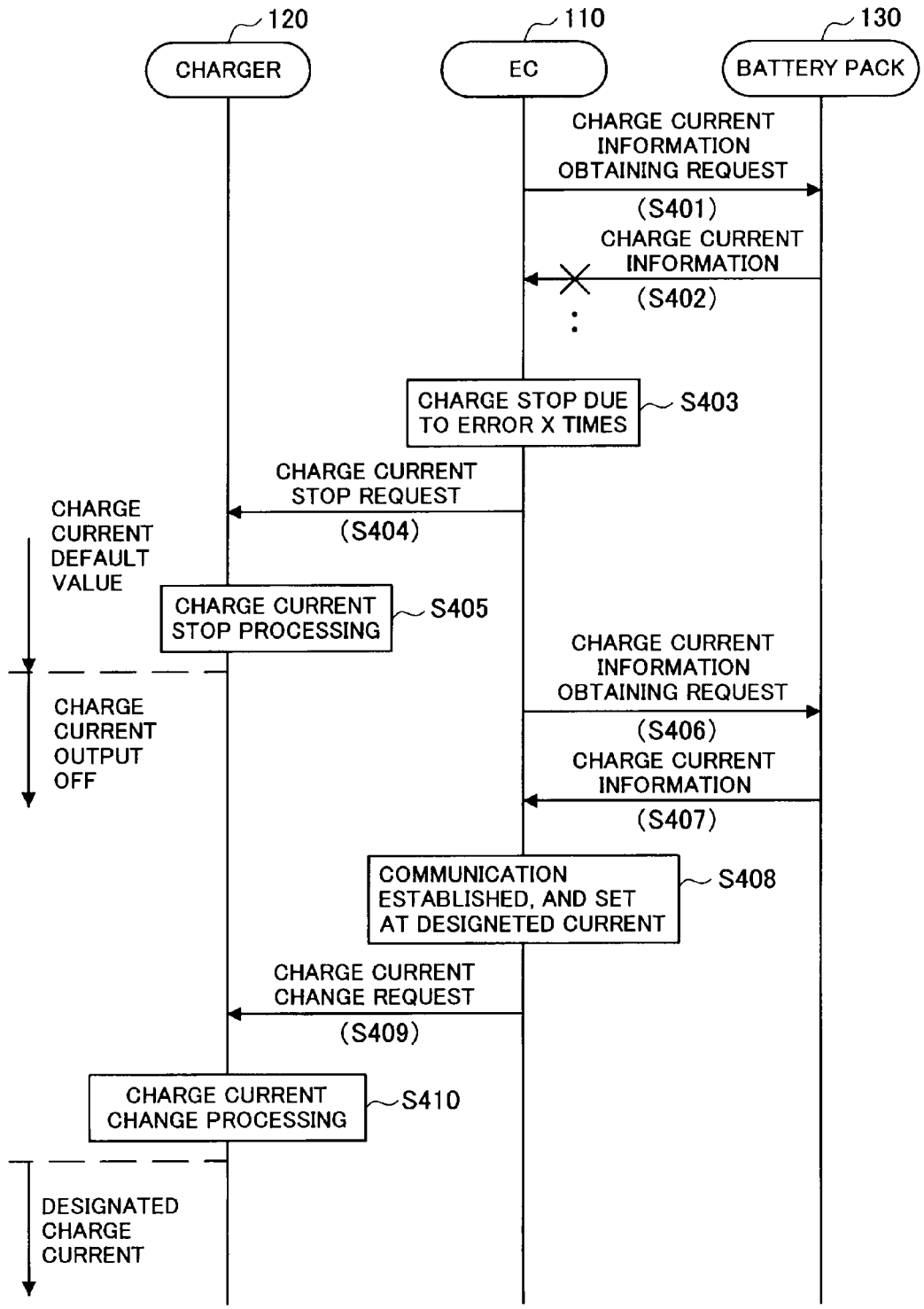
FIG. 7 is a flowchart showing a flow of a processing when a communication is not established.

Next, a processing at the time of failed communication will be described below. FIG. 7 is a flowchart showing a flow of a processing at the time of the failed communication. The processing at the time of the failed communication will be described with reference to FIG. 7 (see other figures as needed).

As shown in FIG. 7, the EC 110 transmits a charge current information obtaining request to the battery pack 130 (step S401). The battery pack 130 transmits the charge current information to the EC 110 (step S402). The EC 110 stops the charging when it fails to receive the charge current information and detects an error X times (X is arbitrary) (step S403). The EC 110 transmits a charge current stop request to the charger 120 (step S404). The charger 120 performs the charge current stop processing (step S405).

The EC 110 transmits a charge current information obtaining request to the battery pack 130 (step S406). The battery pack 130 transmits the charge current information to the EC 110 (step S407). The EC 110 performs a processing of changing a charge current into a designated current at the established communication (step S408). The EC 110 transmits a charge current change request to the charger 120 (step S409). The charger 120 performs the charge current change processing (step S410).

<Battery Detachment Processing>

Figure 8:
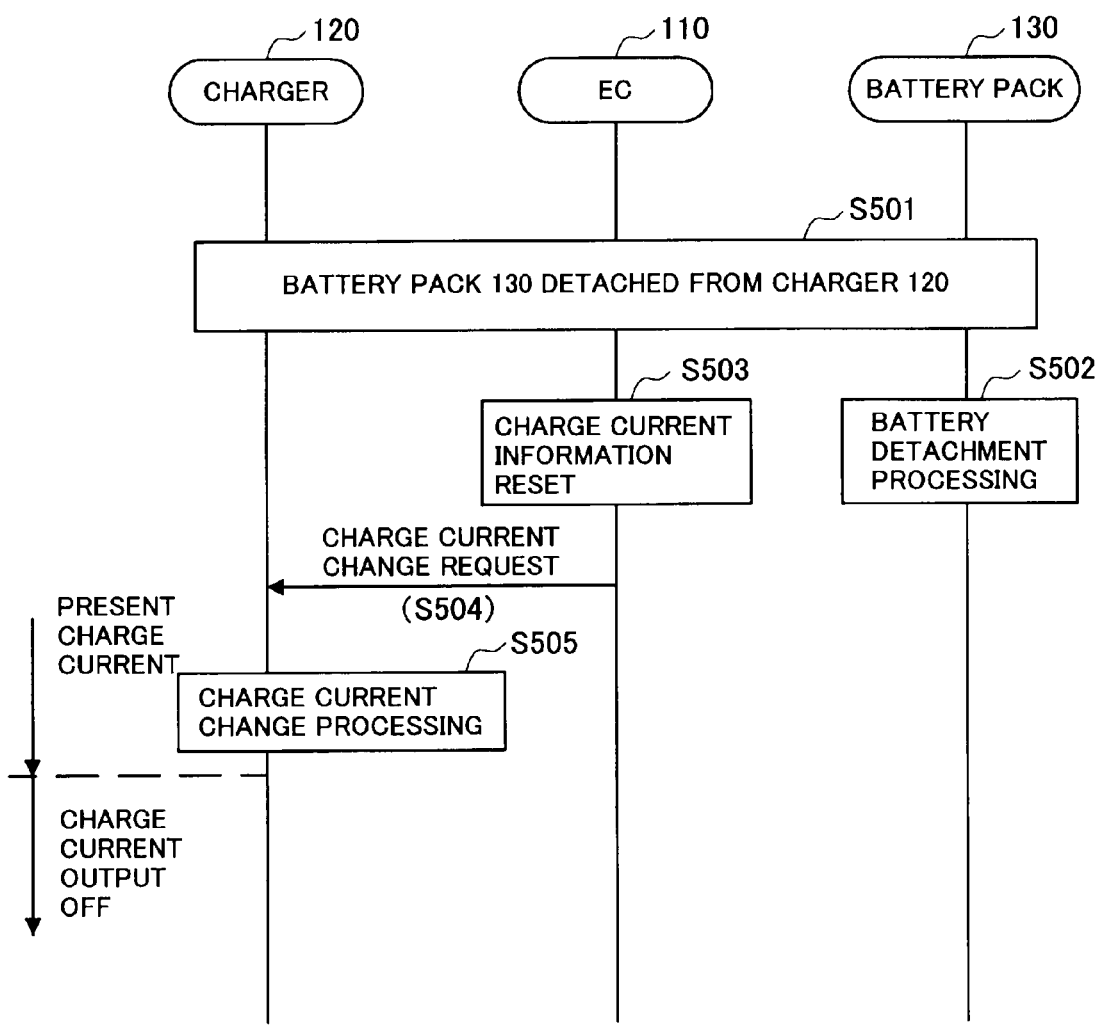
FIG. 8 is a flowchart showing a flow of a battery detachment processing.

A battery detachment processing will be described below. FIG. 8 is a flowchart showing a flow of a battery detachment processing. The battery detachment processing will be described with reference to FIG. 8 (see other figures as needed).

As shown in FIG. 8, the battery pack 130 is detached from the charger 120 (step S501). The battery pack 130 performs the battery detachment processing (step S502) and the EC 110 resets the charge current information (step S503). The EC 110 transmits a charge current change request to the charger 120 (step S504). The charger 120 performs the charge current change processing (step S505).

Effects of the Present Embodiment

The following effects will be obtained according to the present embodiment.

The battery pack 130 can stop charge acceptance depending on the detected status of the battery 138.

The optimal charging can be performed on the battery 138 while both usability and safety are met. (An optimal charge current value is communicated with a microcomputer mounted on the battery based on the battery status, thereby providing a system for switching a charge current in real time.)

Complicated processings are performed at the battery pack 130 so that a load on the EC 110 and a communication load between the EC 110 and the battery pack 130 can be alleviated. Thus, the entire system can improve its performance. (Dedicated custom commands are prepared, thereby alleviating a communication load between the EC and the battery.)

It is possible to develop software without generating variations for each specification and increasing the number of steps for design and development even in several different development institutions.

Variation of the Present Embodiment

It should be understood by those skilled in the art that various modifications, combinations, sub-combinations and alterations may occur depending on design requirements and other factors insofar as they are within the scope of the appended claims or the equivalents thereof.

For example, the information computed in the battery pack 130 is returned to the EC 110 through a dedicated custom command in the present embodiment, but the information on temperature, voltage and remaining capacity can be transmitted to the EC 110 to be computed at the EC 110.

For example, the charge current is assumed to be changed in the present embodiment, but the charge voltage can be also changed.

The technique indicated in the present embodiment can be further applied to support the rapid charge function by an input device such as dedicated mechanical buttons or utility. Thus, the current can be automatically switched into an optimal charge current (normal charge or rapid charge) depending on the status of the battery 138. As one application, there can be employed a function of switching a limit threshold value of the maximum discharge power during discharging.

Second Embodiment

The technique described in the first embodiment is directed for restricting a charge current when the cell temperature of the battery is low or high, and is assumed to perform battery charging at a current having a certain current value in the normal temperature range. However, when the charge current is increased in order to reduce the charge time, if charging/discharging is repeatedly performed on the battery, the capacity of the battery can decrease (cycle deterioration characteristics of the battery can be degraded). There is needed a charge system for meeting both the reduction in the charge time and the maintenance of the cycle deterioration characteristics. The second embodiment is directed for increasing a charge current to the battery to perform rapid charging and thus reducing the charge time without degrading the cycle deterioration characteristics of the battery as compared with the normal charge when predetermined conditions are met.

Outline of Second Embodiment

In the second embodiment, a charge current is increased only in a region where the cell voltage of the battery is low within the normal temperature range. Since the cycle deterioration characteristics are less affected even when the charge current is increased in the range where the cell voltage of the battery is low, the charge time can be reduced while the cycle deterioration characteristics equivalent to the normal charge are being maintained. Further, also when the charge current value is switched in real time so that the temperature and the voltage are changed, sufficient cycle deterioration characteristics and safety can be secured.

System Structure of the Second Embodiment

A system structure of the second embodiment will be described first.

Figure 9:
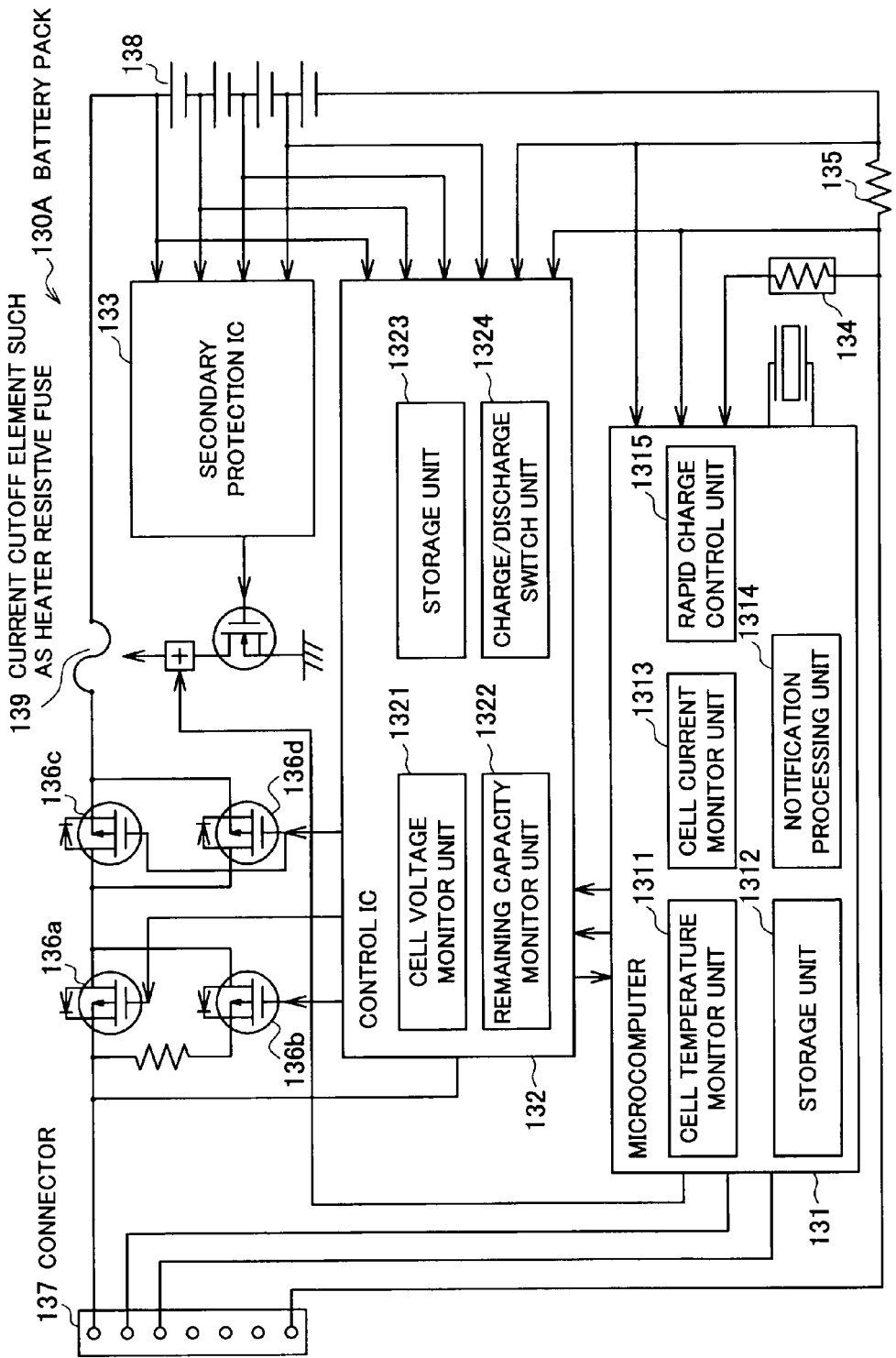
FIG. 9 is a diagram showing a hardware structure of a battery pack according to a second embodiment.

The system structure of the second embodiment is added with a function of performing rapid charge as compared with the system structure of the first embodiment. FIG. 9 is a diagram showing a hardware structure of a battery pack according to the second embodiment. As shown in FIG. 9, in a battery pack 130A according to the second embodiment, a rapid charge control unit 1315 is added to the microcomputer 131 as compared with the battery pack 130 according to the first embodiment.

Basic Operation of the System According to the Second Embodiment

Figure 10:
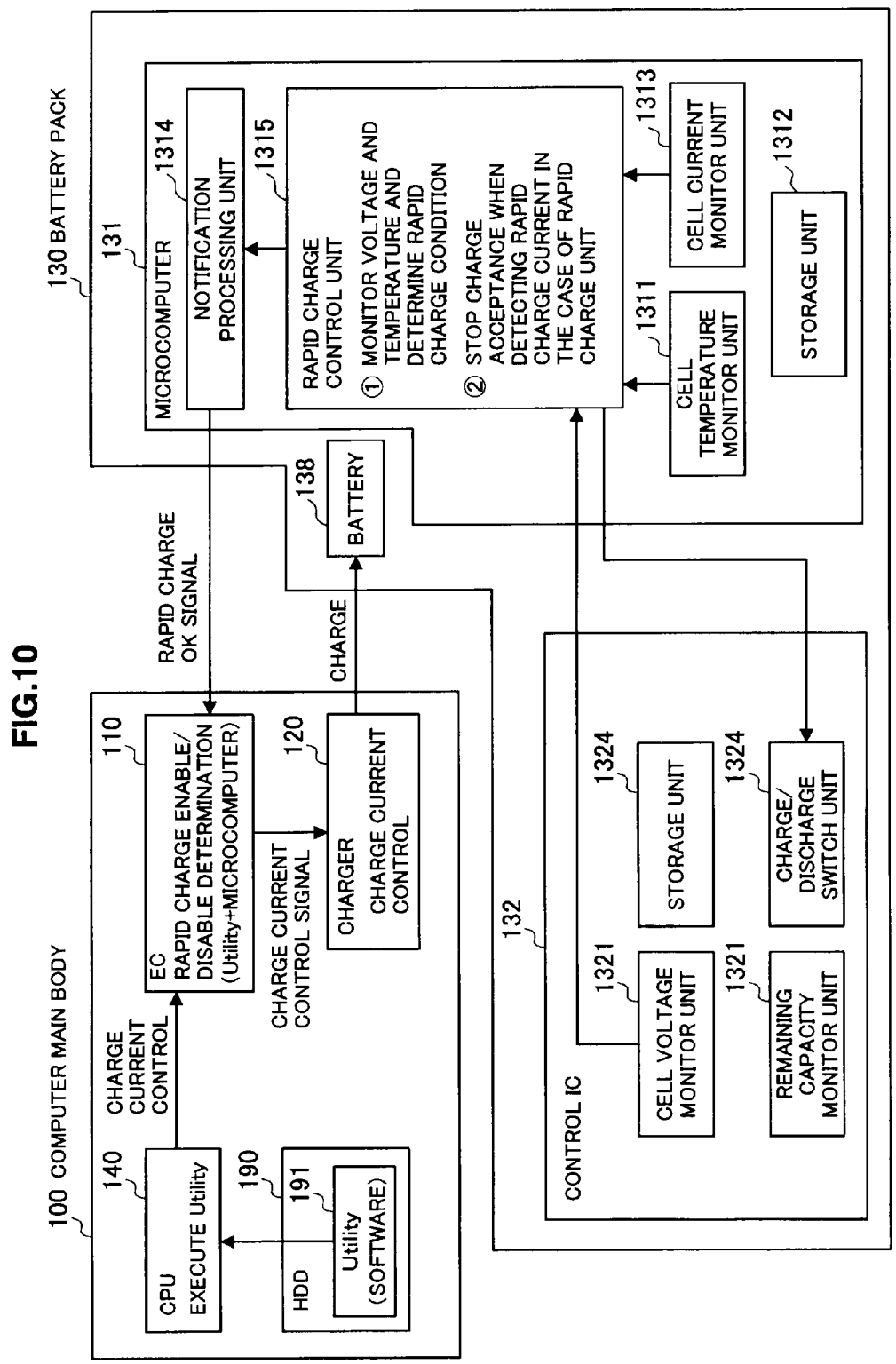
FIG. 10 is a diagram showing a flow of a basic processing for rapid charging in a charge control system according to the second embodiment.
Figure 11:
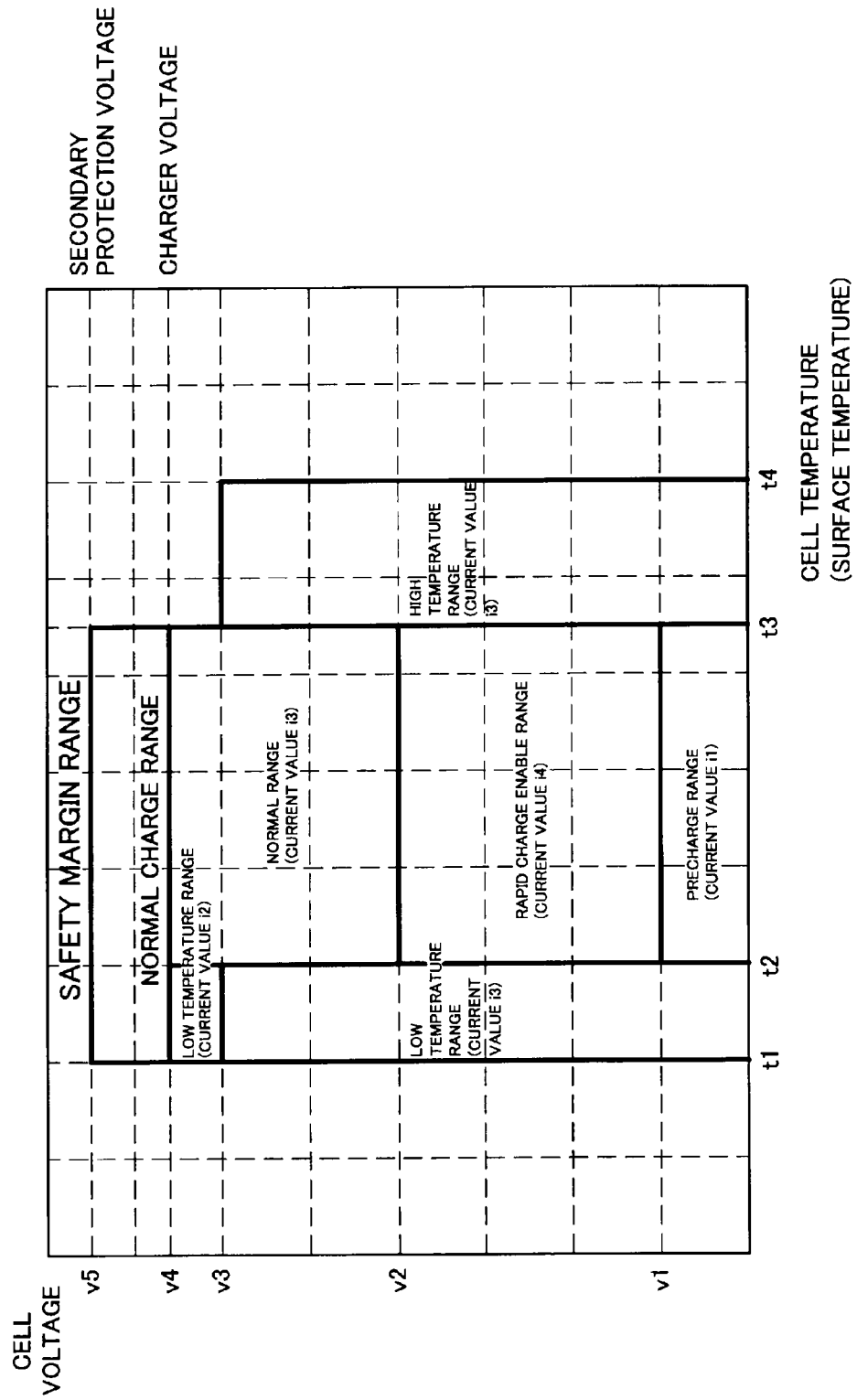
FIG. 11 is a diagram showing one example of a condition under which rapid charging is enabled.

FIG. 10 is a diagram showing a flow of a basic processing relating to rapid charge in a charge control system according to the second embodiment. FIG. 11 is a diagram showing one example of conditions under which rapid charge is possible. FIG. 12 is a diagram showing one example of a protection function in an abnormal device. A flow of the basic processing relating to rapid charge in the charge control system according to the second embodiment will be described with reference to FIGS. 10 to 12.

(1) The EC 110 periodically issues a dedicated custom command.

(2) The notification processing unit 1314 in the battery pack 130 notifies the EC 110 of optimal current value information needed by the battery 138 in response to the command. At this time, the rapid charge control unit 1315 determines whether the rapid charge is possible for the battery 138 depending on the status of the battery 138. The rapid charge control unit 1315 determines that the charging is possible when the status off the battery 138 meets a certain condition, and notifies the EC 110 of a rapid charge OK signal via the notification processing unit 1314. The rapid charge control unit 1315 notifies the EC 110 of the rapid charge OK signal via the notification processing unit 1314 in the present embodiment but a rapid charge NG signal may be notified to the EC 110 via the notification processing unit 1314. The rapid charge control unit 1315 may notify the EC 110 of rapid charge enable/disable information indicating the determination result via the notification processing unit 1314.

As described above, for example, the conditions may include the cell temperature of the battery 138. Further, for example, the conditions may include the cell voltage of the battery 138. In the example shown in FIG. 11, there is shown a case in which the conditions for both the cell temperature and the cell voltage of the battery 138 are included as certain conditions relating to the battery 138. In the example shown in FIG. 11, t1, t2, t3 and t4 denote the cell temperature indicating a boundary value between adjacent regions, and the relationship thereof is $t1<t2<t3<t4$, for example. v1, v2, v3, v4 and v5 denote the cell voltage indicating a boundary value between adjacent regions, and the relationship thereof is $v1<v2<v3<v4<v5$, for example. Numerals i1, i2, i3 and i4 in parentheses shown in FIG. 11 denote an optimal current value in each region, and the relationship thereof is $i1<i2<i3<i4$, for example. For example, a region indicated as "rapid charge enable region" is indicated as a region which meets the conditions under which the cell temperature of the battery 138 is t2 to t3 and the cell voltage of the battery 138 is v1 to v2. The rapid charge control unit 1315 can obtain the cell temperature of the battery 138 from the cell temperature monitor unit 1311 and can obtain the cell voltage of the battery 138 from the cell voltage monitor unit 1321. A certain condition on the battery 138 (such as boundary value between adjacent regions shown in FIG. 11, for example) is stored in the storage unit 1312 as a threshold value.

In the example shown in FIG. 11, a region indicated as "rapid charge enable region" is assumed as a region which meets at least the condition under which the cell voltage of the battery 138 is v1 to v2. There is generally known a phenomenon that when the charge current value is increased at the high cell voltage of the battery 138, the cycle deterioration characteristics of the battery 138 are remarkably degraded. For example, the experimental data may specify, when rapid charge is performed, an upper limit value (about 60% of the remaining capacity of the battery 138) of the cell voltage at which the cycle deterioration characteristics as the same level as when rapid charge is not performed can be maintained, and may assume the specified value at v2. In the example shown in FIG. 11, in the region indicated as "rapid charge enable region", the upper limit value of the cell voltage of the battery 138 is set at v2. However, the upper limit value is not limited to the above value, and is specified by logical values or experimental values appropriately calculated.

(3) The EC 110 determines a charge current value and outputs a charge current control signal indicating the determined charge current value to the charger 120 based on the optimal current value information and the rapid charge enable/disable information indicated in the response data. The charger 120 outputs a charge current having the charge current value indicated by the charge current control signal to the battery 138 to charge the battery 138.

The CPU 140 executes Utility software stored in the HDD 190, and may accept the information indicating whether the rapid charge is performed from the user through the software function, and output it to the EC 110. In this case, when EC 110 accepts an input of the rapid charge OK signal from the microcomputer 131 and receives a rapid charge instruction of performing rapid charge from the CPU 140, the EC 110 may determine that the rapid charge will be performed.

The charge level may be determined by the EC 110 and the charge current value corresponding to the charge level may be determined in consideration of the status of the battery 138 in addition to the optimal current value information, the rapid charge enable/disable information or user's instruction.

(4) As shown in FIG. 12, when the EC 110 is in a normal state and the microcomputer 131 is in an abnormal state, the EC 110 detects a communication error relative to the microcomputer 131 and stops the charge current output from the charger 120 to the battery 138, thereby securing the safety.

(5) As shown in FIG. 12, when the microcomputer 131 is in a normal state and the EC 110 is in an abnormal state, the rapid charge control unit 1315 detects the abnormality of the charge current and the charge/discharge switch unit 1324 stops the acceptance of the charge current from the charger 120. The rapid charge control unit 1315 obtains a present charge current value from the cell current monitor unit 1313. The storage unit 1312 may store therein a threshold value of the charge current value in the case of the rapid charge OK and a threshold value of the charge current value in the case of the rapid charge NG separately. In this case, when it is detected that the present charge current value exceeds the threshold value corresponding to the present state, the rapid charge control unit 1315 detects the abnormality of the charge current from the charger 120.

Advantages of the System According to the Second Embodiment

The charge time can be reduced while the cycle deterioration characteristics are being maintained. The charge current is increased only in a region where the cell voltage of the battery 138 is low within the normal temperature range so that the charge time can be reduced while the cycle deterioration characteristics equivalent to the normal charge are maintained. Since the cell voltage of the battery 138 is low when the remaining capacity of the battery 138 is less, if the rapid charge can be performed when the remaining capacity of the battery 138 is less, high usability can be also maintained.

The charge current can be changed in real time so that the cycle deterioration characteristics and the safety can be maintained even when the temperature and the voltage are changed. Since the temperature and the voltage of the battery pack 130 change over time depending on the usage, the optimal charge current value of the battery pack 130 also changes. The magnitude of the charge current output by the charge circuit and the operation point of the safety circuit are adapted to the optimal charge current value of the battery pack 130 in real time so that the cycle deterioration characteristics can be maintained even when the temperature and the voltage of the battery pack 130 are changed. Further, the recommended standards issued from JEITA or Battery Association of Japan are satisfied, thereby securing sufficient safety.

Variation of the Second Embodiment

It should be understood by those skilled in the art that various modifications, combinations, sub-combinations and alterations may occur depending on design requirements and other factors insofar as they are within the scope of the appended claims or the equivalents thereof.

For example, a determination is made as to whether the rapid charge is possible based on the temperature and the voltage in the second embodiment, but there can be added a function of stopping charging when the remaining capacity of the battery reaches a predetermined capacity or when the voltage of the battery reaches a predetermined voltage. For example, while charging is being performed on the battery, when the remaining capacity of the battery exceeds 80%, the charging can be stopped. Thus, the cycle deterioration characteristics of the battery pack can be further improved.

The user can set the rapid charge enable/disable in the second embodiment, but it is possible to perform charging in a charge profile adapted to user's taste by analyzing the user's battery usage history information. For example, a temporal change in the remaining capacity of the battery is stored in the storage unit 1312 or the like as the user's battery usage history information. Then, the rapid charge control unit 1315 determines whether the number of times by which the discharging is performed until the remaining capacity reaches a predetermined value (stored in the storage unit 1312, for example) or less is larger than a predetermined rate (stored in the storage unit 1312, for example) relative to the total number of times of the discharging. When the number of times is larger than the predetermined rate, it is determined that the user often carries the battery, and the rapid charge may be automatically performed. Further, it is determined from the full-charged battery that the user does not often carry the battery, and the rapid charge control unit 1315 may not perform the rapid charge.

The software protection functions against abnormal operations are incorporated in the EC and the battery pack, respectively, in the second embodiment, but the hardware protection function such as current limit switch is incorporated, thereby further improving the safety.

One battery pack is connected to one computer main body in the second embodiment, but several battery packs may be connected to one computer main body. In this case, the EC in the computer main body may perform charge control for each battery pack.

Effects by the Second Embodiment

The following effects can be obtained according to the second embodiment.

The charge time can be reduced while the cycle deterioration characteristics are maintained as compared with the charge system in related art.

The technique according to the second embodiment can be developed into several batteries having different charge current values, and several batteries having the different number of battery cells are connected to one notebook type PC and the rapid charge can be realized for each battery.

The rapid charge is enabled when the battery cell voltage is low (=the remaining amount of battery is less) so that high usability is obtained.

Since much charging can be performed for a short time such as traveling for users who often carry a notebook type PC, the AC adaptor does not need to be carried with the user and the mobility is enhanced.

Complicated processings are performed at the battery pack so that a load on the EC and a communication load between the batteries can be alleviated. Thus, abnormal operations by communication errors or the like can be reduced and safety can be improved.

The present application contains subject matter related to that disclosed in Japanese Priority Patent Application JP 2008-181945 filed in the Japan Patent Office on Jul. 11, 2008 and Japanese Priority Patent Application JP 2008-231432 filed in the Japan Patent Office on Sep. 9, 2008, the entire contents of which is hereby incorporated by reference.

What is claimed is:

1. A battery pack comprising:
    an obtaining unit configured to obtain computation information for calculating a charge current, the computation information including temperature information of a battery;
    a computation unit configured to compute a charge current for the battery based on the computation information, the computation unit configured to set the charge current to a first current if the temperature is between a first temperature and a second temperature and the voltage is above a first voltage, to set the charge current to a second current less than the first current if the temperature is between a third temperature and a fourth temperature and not between the first temperature and the second temperature, and to set the charge current to a third current if the temperature is between the first temperature and the second temperature and the voltage is below the first voltage, where the third current is greater than the first current; and
    a notification unit configured to notify a computer of the charge current computed by the computation unit.

2. The battery pack according to claim 1, wherein the notification unit uses a dedicated command to notify the computer of the charge current.

3. The battery pack according to claim 1, further comprising:
   a detection unit configured to detect whether the temperature information is below the third temperature or above the fourth temperature, wherein when the detection unit detects that the temperature information is below the third temperature or above the fourth temperature, the notification unit notifies a computer of a request of stopping the battery charging.

4. The battery pack according to claim 1, wherein the computation unit computes a charge current for the battery, and determines whether battery rapid charging is enabled based on the computation information, and the notification unit notifies the computer of the charge current computed by the computation unit and notifies the computer of rapid charge enable/disable information indicating the result determined by the computation unit.

5. An information processing apparatus comprising:
   a battery pack including:
      an obtaining unit configured to obtain computation information for calculating a charge current, the computation information including temperature information of a battery;
      a computation unit configured to compute a charge current for the battery based on the computation information, the computation unit configured to set the charge current to a first current if the temperature is between a first temperature and a second temperature and the voltage is above a first voltage, to set the charge current to a second current less than the first current if the temperature is between a third temperature and a fourth temperature and not between the first temperature and the second temperature, and to set the charge current to a third current if the temperature is between the first temperature and the second temperature and the voltage is below the first voltage, where the third current is greater than the first current; and
      a notification unit configured to notify a computer of the charge current computed by the computation unit; and
   the computer having a charge control unit configured to perform the battery charging based on the charge current notified from the notification unit.

6. A charge control system comprising
   a battery pack including:
      an obtaining unit configured to obtain computation information for calculating a charge current, the computation information including temperature information of a battery;
      a computation unit configured to compute a charge current for the battery based on the computation information, the computation unit configured to set the charge current to a first current if the temperature is between a first temperature and a second temperature and the voltage is above a first voltage, to set the charge current to a second current less than the first current if the temperature is between a third temperature and a fourth temperature and not between the first temperature and the second temperature, and to set the charge current to a third current if the temperature is between the first temperature and the second temperature and the voltage is below the first voltage, where the third current is greater than the first current; and
      a notification unit configured to use a dedicated command to notify a computer of the charge current computed by the computation unit; and
   the computer having a charge control unit configured to perform the battery charging based on the charge current notified from the notification unit.

* * * * *